(12) United States Patent
Skarby et al.

(10) Patent No.: US 7,797,013 B2
(45) Date of Patent: Sep. 14, 2010

(54) RADIO COMMUNICATIONS USING SCHEDULED POWER AMPLIFIER BACKOFF

(75) Inventors: Ulf Skarby, Lidingo (SE); Karl-Gosta Sahlman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 732 days.

(21) Appl. No.: 11/711,837

(22) Filed: Feb. 28, 2007

(65) Prior Publication Data

US 2008/0207143 A1    Aug. 28, 2008

(51) Int. Cl.
   *H04B 7/00*     (2006.01)
(52) U.S. Cl. .......................................... 455/522; 455/69
(58) Field of Classification Search ................. 455/500, 455/501, 509, 522, 527, 69, 70; 370/310, 370/311
   See application file for complete search history.

(56) References Cited

U.S. PATENT DOCUMENTS

| 6,741,661 B2 | 5/2004 | Wheatley, III et al. | 375/296 |
| 2003/0027588 A1 * | 2/2003 | Futakata et al. | 455/522 |

FOREIGN PATENT DOCUMENTS

| EP | 1239602 | 9/2002 |
| EP | 1282241 | 2/2003 |
| WO | WO 0038351 | 6/2000 |

OTHER PUBLICATIONS

International Search Report and Written Opinion of the International Searching Authority mailed Feb. 13, 2008 in corresponding PCT Application PCT/SE2007/050224.
Nakamura et al., "Wireless P-MP Transmission with Multicode Assignment Algorithm", Electronics and Communications in Japan Part 1, vol. 89, No. 8, 2006, sid. 14-25; Translated from Denshi Joho Ronbunshi, vol. J88-B, No. 6, Jun. 2005, sid. 1067-1077.

* cited by examiner

*Primary Examiner*—Thanh C Le
(74) *Attorney, Agent, or Firm*—Nixon & Vanderhye P.C.

(57) ABSTRACT

Radio transmissions to multiple radio terminals are improved using scheduled backoff of a multi-signal power amplifier. A radio channel quality associated with each of the radio terminals is determined. First signals for first radio terminals associated with a better channel quality are amplified by a power amplifier during a first time period resulting in a first composite output signal. Second signals for second radio terminals associated with a lower channel quality are amplified by the power amplifier during a second time period resulting in a second composite output signal. Transmission during the first time period occurs at a first power level, e.g., mean power, that is associated with a lower probability of clipping the first composite output signal. During the second time period, the second composite signal is transmitted at a second power level, e.g., mean power, higher than the first power level which improves reception at the second terminals.

25 Claims, 8 Drawing Sheets

RADIO COMMUNICATIONS USING SCHEDULED POWER AMPLIFIER BACKOFF

TECHNICAL FIELD

The technical field relates to radio communications, and in particular, to improving radio communications based on radio channel conditions.

BACKGROUND

According to Shannon, the maximum possible bit rate C over a radio transmission link depends on the signal-to-noise ratio (SNR) as follows:

$$C = \text{Log}_2(1+S/N)$$

The highest possible SNR is further limited by the Error Vector Magnitude (EVM) which is a measure of how far away an actual complex transmission symbol is from its ideal location in the complex constellation. FIG. 1 for example shows an ideal complex symbol vector V and the error vector E. The EVM equals E/V. The EVM may be caused by a number of sources such as filter delay, insertion loss, radio channel variations, and clipping of the transmitted signal.

FIG. 2 shows the amplitude of a signal with multiple signal peaks that exceed positive and negative amplitude threshold values. To accommodate these peaks within the DC-voltage range, the gain or mean power level must be reduced. These peaks increase peak-to-average power ratio. A high peak-to-average power ratio results in a low mean power that results in reduced efficiencies for a radio transmitter's power amplifier. For example, a high peak-to-average ratio means less clipping probability, a better EVM, but less mean output power such that path loss increases. A power amplifier with a greater linear range is required. In addition, a larger maximum power requires more current, more cooling, and larger transistors. Thus, a high peak-to-average power ratio results in higher cost due to these cooling and transistor requirements.

To reduce a high peak-to-average power ratio, radio transmitters may "clip" the signal peaks in order to limit the maximum amplitude of the transmitted signal. Clipping thus facilitates higher mean output power which is advantageous on especially longer distances. Unfortunately, clipping introduces a significant amount of in-band noise as well as out-of-band spurious emissions resulting in increased EVM, which in turns means, for example, a lower possible maximum bit rate.

One way to avoid clipping and decrease EVM is to "back-off" or reduce the input power of the power amplifier. FIG. 3 graphs the output power (in mW) to input power (in mW) relationship of a typical power amplifier over time. If the input power is below a maximum power level, then the power amplifier operates in a linear manner where an increase in input power is matched by a proportional increase in the output power, as shown in the linear region. But if the input power exceeds a certain value, then the power amplifier operates in a nonlinear manner where an increase in the input power is not matched by a proportional increase in the output power. The output power is less than ideal in the power amplifier's nonlinear operating range resulting in increased EVM. Moreover, if the mean power value is too high, some peaks are clipped—a source of further non-linearity—as shown in FIG. 3.

When a radio base station transmitter employs code division multiple access (CDMA), the transmitted signal is a composite signal that includes multiple signals directed to multiple radio terminals, each radio terminal signal being encoded with random codes or sequences. When multiple CDMA signals intended for various radio terminals are input to a single power amplifier and amplified, the amplified composite output signal includes peaks in the composite signal are generated that are not typically present in other communication signals where a power amplifier is only amplifying one signal at a time.

FIG. 4 illustrates a multi-signal power amplifier (PA) that receives multiple input signals (e.g., five input signals A-E are shown in FIG. 4) and amplifies them during the same time period. As mentioned above, a multi-signal amplifier may be useful for example in CDMA transmissions where each input signal is coded using a different CDMA code. But multi-signal amplifiers are not limited to CDMA applications or to transmitting to multiple radios. For example, orthogonal frequency division multiplexing (OFDM) transmission may also use a single power amplifier to amplify multiple signals, i.e., sub-carriers, at the same time. And multiple signals might be transmitted to a single radio terminal. The problem is thus related to amplifying multiple input signals during the same time period by a single power amplifier rather than a particular type of transmission or a particular number of receivers.

FIGS. 5A and 5B illustrate the signal peaking problem associated with multi-signal power amplifier using the power amplifier (PA) shown in FIG. 4. FIG. 5A illustrates simplified waveforms for each of the five input signals A-E over the course of eight time slots. FIG. 5B shows the resulting composite output signal generated by the power amplifier (PA). The input signals are superpositioned in the power amplifier (PA) so that the composite signal has a peak in time slot 5 that exceeds a maximum allowed power, and thus, must be clipped.

The inventors realized that existing transmitters make no distinction between first signals provided to a multi-signal power amplifier in which clipping is necessary and other second signals provided during the same time period to the multi-signal power amplifier in which clipping is not necessary. Instead, all of those signals would be clipped resulting unfortunately in increased EVM and other disadvantages described above for the first signals.

SUMMARY

Radio transmissions to multiple radio terminals are improved using scheduled backoff of a multi-signal power amplifier. A radio channel quality associated with each of the radio terminals is determined. First signals for first radio terminals associated with a better channel quality are scheduled to be amplified by a power amplifier during a first time period resulting in a first composite output signal. Second signals for second radio terminals associated with a lower channel quality are scheduled to be amplified by the power amplifier during a second time period resulting in a second composite output signal. Transmission during the first time period at a first power level results in a lower probability of clipping the first composite output signal, a decreased EVM, and the option for higher quality of service, e.g., higher bit rates, higher order modulation, MIMO, etc. Transmission during the second time period at a second power level higher than the first power level results in a higher clipping probability but better performance/quality of service given the lower channel quality.

The first power level is a backed-off power level that reduces a probability of clipping as compared to a probability of clipping at the second power level. The first and/or second signals may include multiple signals input to the power amplifier or multiple signals combined before input to the power amplifier. The predetermined level may be associated with a signal-to-noise ratio, a carrier-to-interference ratio, or a received signal strength value.

An example implementation is in a radio base station. The predetermined level may be determined based on information provided by the radio terminals, or it may be determined based on information determined in the base station. The radio base station may be one, for example, that transmits signals to the radio terminals using code division multiple access (CDMA) or orthogonal frequency division multiplexing (OFDM).

Various other adaptive measures may be taken in conjunction with the selective backoff. For example, the first composite signal may be transmitted to the first number of radio terminals at a first data rate higher than a second data rate at which the second composite signal is transmitted to the second number of radio terminals. The first composite signal may also be transmitted to the first number of radio terminals using a first modulation technique that has a higher order than a second modulation technique used to transmit the second composite signal to the second number of radio terminals.

Another non-limiting example embodiment includes transmitting the first composite signal to the first number of radio terminals using a multiple input multiple output (MIMO) communications technique while transmission of the second composite signal to the second number of radio terminals does not use a MIMO technique. Alternatively, the first composite signal to the first number of radio terminals may use transmission diversity while transmission of the second composite signal to the second number of radio terminals does not use transmission diversity. Still further, the first composite signal may be transmitted to the first number of radio terminals using a MIMO technique, and the second composite signal may be transmitted to the second number of radio terminals using transmission diversity.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. As mentioned above, the technology described here has ready application to any transmitter that uses a multi-signal power amplifier and is not limited to any particular radio transmission technique. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

The term "backoff" describes decreasing the mean output power of a power amplifier (or mean transmit power level) from its nominal mean power level. Lowering the mean power level of or backing-off the power amplifier results in better EVM and a higher bit rate for receivers associated with higher quality radio channels. But a backed-off power level also lowers the effective bit rate for receivers with lower quality radio channels where the receiver is limited by external interference and thermal noise. In contrast, for a higher quality radio channel, the receiver is limited by internal distortion from clipping, filtering, and amplifier nonlinearities. The inventors discovered that selectively controlling a multi-signal power amplifier to provide back-off or no back-off amplification for multiple signals, depending upon the quality of condition of the radio channels associated with the multiple signals, provides numerous benefits.

Figure 1:
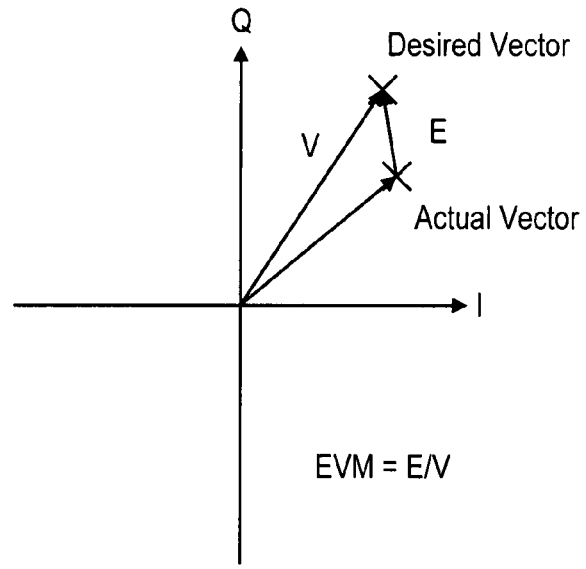
FIG. 1 is an complex plane graph illustrating an error vector magnitude (EVM)
Figure 2:
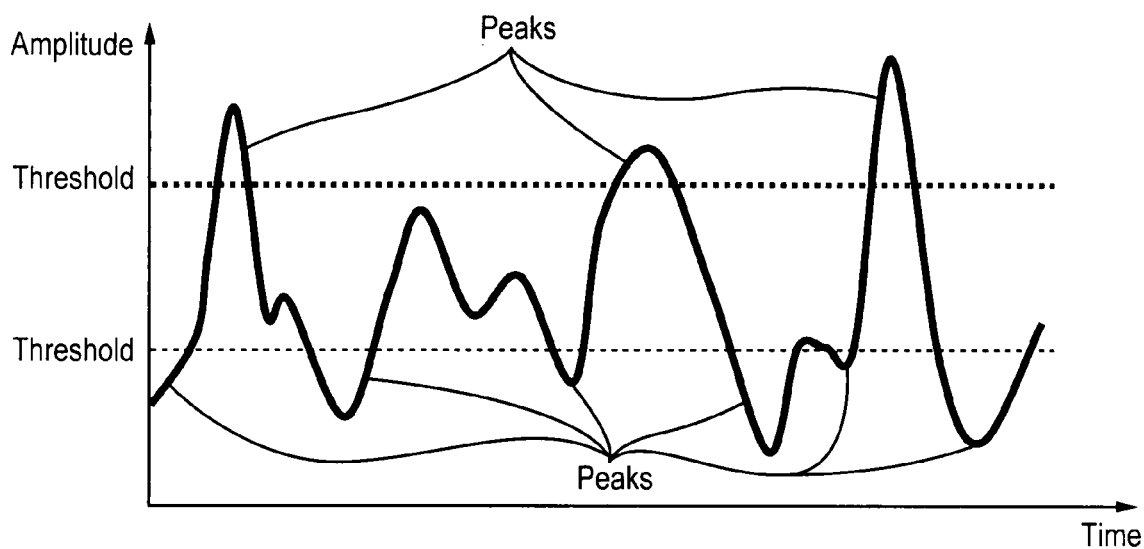
FIG. 2 is a graph showing a transmitted radio waveform with multiple signal peaks that exceed threshold values.
Figure 3:
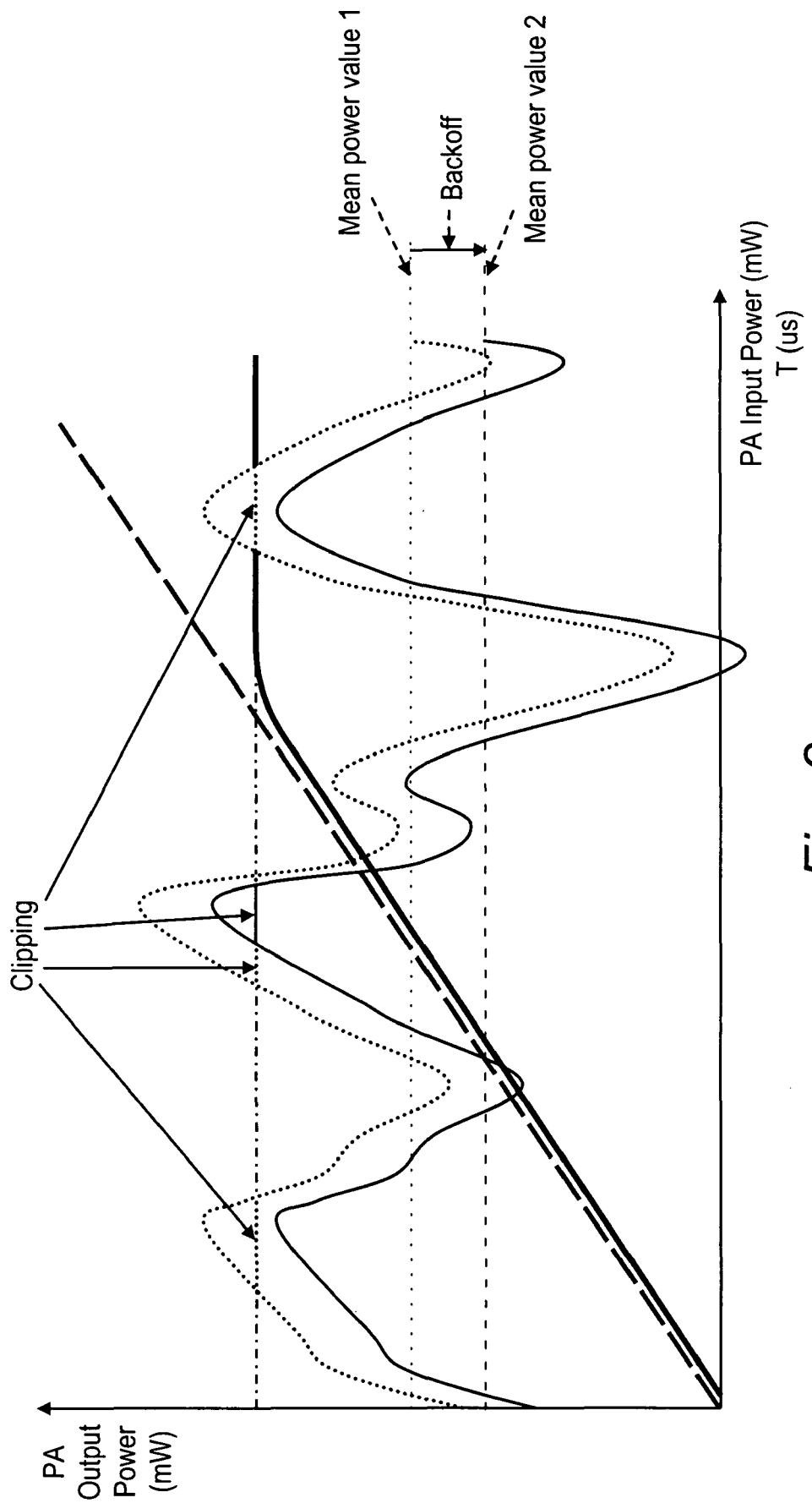
FIG. 3 is a graph illustrating power amplifier backoff.
Figure 4:
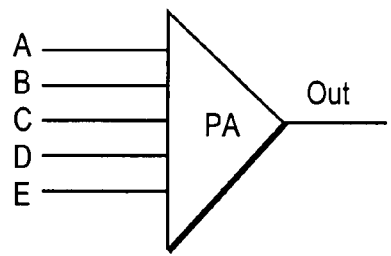
FIG. 4 is a multi-signal power amplifier.
Figure 5A:
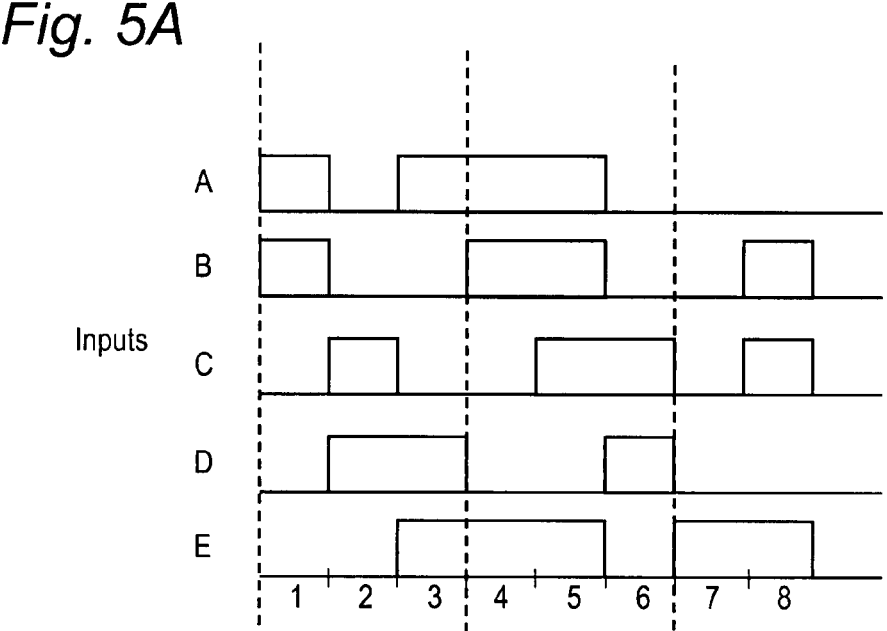
FIG. 5A is a graph showing when the power amplification in FIG. 3 transmits an output signal for each one of the multi-signals.
Figure 5B:
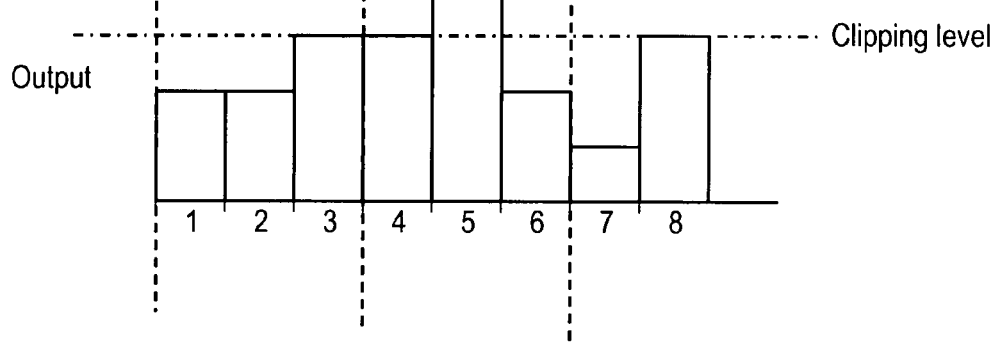
FIG. 5B is a graph showing a sum of the multi-signals as an output composite signal that results in signal clipping during one time interval.
Figure 6:
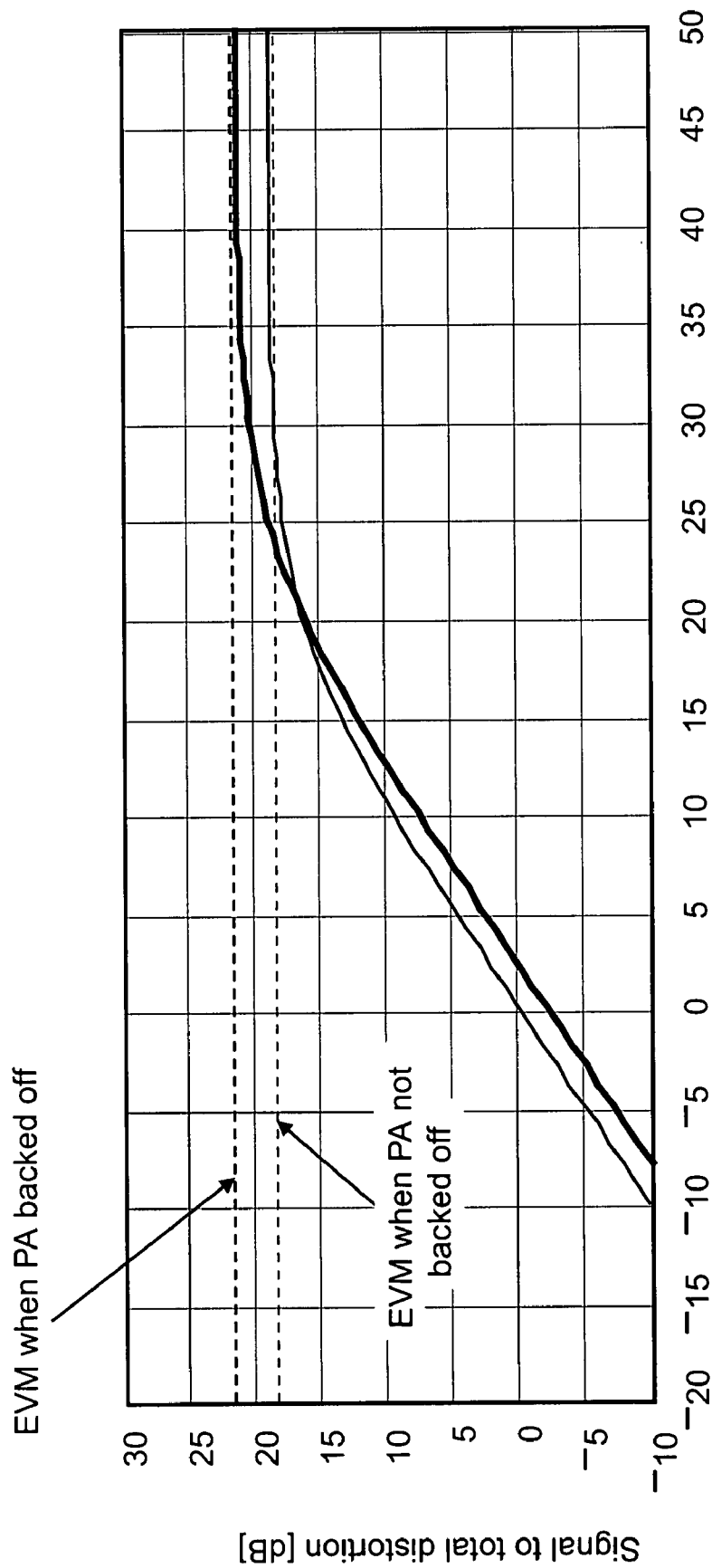
FIG. 6 is a graph illustrating a total EVM for an example power amplifier such as that shown in FIG. 4.

FIG. 6 is a graph illustrating a total error vector magnitude (EVM) for an example multi-signal power amplifier. FIG. 6 is a simulation based on a received signal represented by a first constant signal divided by thermal noise and external interference plotted on the X axis and a received signal represented by a second constant signal divided by the sum of thermal noise, external interference, and EVM on the Y axis, with the thermal noise+external interference as a variable. The received signal-to-noise ratio (S/N) corresponds to the quality or condition of the radio channel over which a multiple signal amplifier composite signal is to be transmitted.

The curve shown with a thin line in the graph corresponds to a multi-signal power amplifier output in which the amplifier power level is not backed-off and hence transmission occurs at a relatively high mean output power. In this non-limiting example (i.e., any other suitable values may be used), for a relatively poor channel quality on the order of −10 dB up into threshold channel quality of approximately 20 dB, the signal-to-total distortion improves relatively linearly. In this part of the curve, the main contributors of bad quality include thermal noise and external interference. After the reception signal-to-noise ratio (channel quality) exceeds 20 dB, the thin line plateaus at a lower, thinner dotted line, corresponding to a total EVM value when the power amplifier is not backed off, that is somewhat less than 20 dB. Further improvements in channel quality do not result in any improved signal-to-total distortion or any further increase in EVM. When reception signal-to-noise ratio (channel quality) exceeds 20 dB, the main contributors of bad quality include clipping, filtering, and amplifier nonlinearities.

The thicker curve line represents an output of the multi-signal power amplifier having been backed-off so that the transmitted composite signal is transmitted at a lower power level. In this example, the backoff of the amplifier was on the order of 2.2 dB. Again, as the channel quality (indicated by reception signal-to-noise ratio) increases from a relatively poor channel quality up into approximately 20 dB, the signal-to-total distortion increases linearly. Above approximately 20 dB, the thick line curve increases non-linearly and slower until it plateaus at approximately 40 dB at a signal-to-total distortion ratio on the order of 22 dB.

The graph illustrates what the inventors discovered. Better signal-to-total distortion (performance) is achieved without backup (the thinner line has a greater signal-to-total distortion than the thicker line) for relatively poor channel qualities (reception signal-to-noise ratio) up to a channel quality (reception signal-to-noise ratio) of approximately 20 dB. At that point, better signal-to-total distortion (performance) is achieved with amplifier backoff (the thicker line) for channel qualities that are about 20 dB or more. In more general terms, for channels in which the quality is below a particular threshold, better performance can be achieved by not backing the power amplifier off. On the other hand, when the channel quality exceeds that particular threshold, better performance can be achieved by backing the multi-signal power amplifier off and transmitting the composite signal at a lower power level. But if the multi-signal power amplifier is simply set to be either always backed-off or not backed-off without taking into account the particular quality of each channel corresponding to each signal input to the multi-signal power amplifier, then this performance gain is not realized.

Another problem is that when the amplifier operates without back-off at higher transmission power levels, the EVM is higher resulting in a higher likelihood of clipping, which distorts the output signal resulting in a lower signal quality. This may be acceptable or even necessary in order to ensure that receiving radio terminals can adequately receive the signal over less than optimum radio channels. On the other hand, it is better to lower EVM to avoid signal clipping in order to reduce distortion of the signal content by backing off the power level of the multi-signal amplifier—a good option when the radio channel quality is good.

One non-limiting example way to obtain the increased performance provided from both backoff and no backoff operation is to divide the signal inputs to the amplifier into two (or more) groups. A first group includes signals associated with favorable channel conditions. A second group includes signals associated with less favorable channel conditions. The first group is provided to the power amplifier during a first time period with the amplifier backed off, and the second group is provided to the amplifier during a second time period with the amplifier not backed off. That way the first group of signals can take advantage of the benefits of a lower EVM, and the second group of signals can benefit from the extra transmit power for transmission over channels that are not quite as good.

Figure 7:
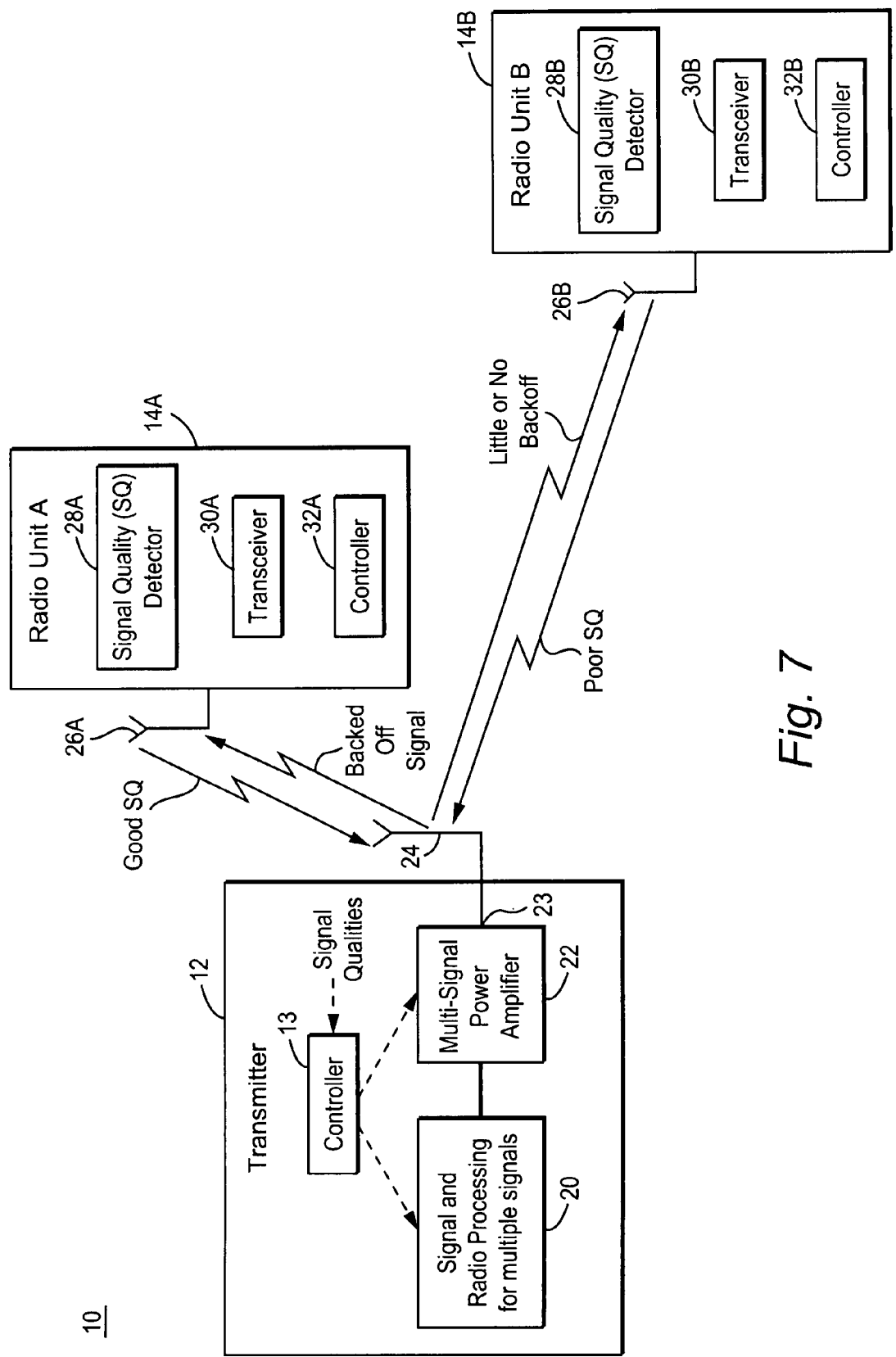
FIG. 7 is a diagram illustrating a non-limiting example radio transmitter in a radio communications system that uses scheduled power amplifier backoff.

FIG. 7 is a diagram illustrating a non-limiting, example radio transmitter 12 in a radio communication system 10 that uses scheduled, multi-signal power amplifier back-off. The transmitter 12 includes a controller 13 for receiving signal quality values for radio channels over which it is transmitting and providing control signals to a signal and radio processing block 20 that provides multiple signals for amplification and transmission to a multi-signal power amplifier 22. The multiple signals may be provided individually to the power amplifier and combined there into a composite output signal, or they may be combined beforehand into a composite input signal. The multi-signal power amplifier 22 generates the composite output signal 23 which is transmitted over one or more antennas 24 to various radio units 14. Two radio units A and B are shown at blocks 14A and 14B. Radio unit A is located relatively close to the transmitter 12, and therefore in this example, has a relatively good signal quality associated with the radio channel from the transmitter 12 to the radio unit A.

Radio unit A includes a signal quality detector 28A for detecting the downlink signal quality information from the transmitter 12 received over its antenna 26A and processed by a transceiver 30A under the control of controller 32A. That channel quality information is transmitted to the controller 13 in the transmitter 12. In contrast, radio unit B is located further away from transmitter 12, and therefore, its signal quality detector 28B detects a poorer quality over the downlink channel from the transmitter 12. Radio unit B also has a transceiver 30B, a controller 32B and one or more antennas 26B and provides its detected channel quality information back to the transmitter 12. Based on the channel qualities provided, the controller 13 controls the time periods when the multi-signal power amplifier transmits a backed-off signal to the radio unit A associated with a relatively good channel condition or a signal with little or no back-off to radio unit B associated with a poorer channel condition.

Figure 8:
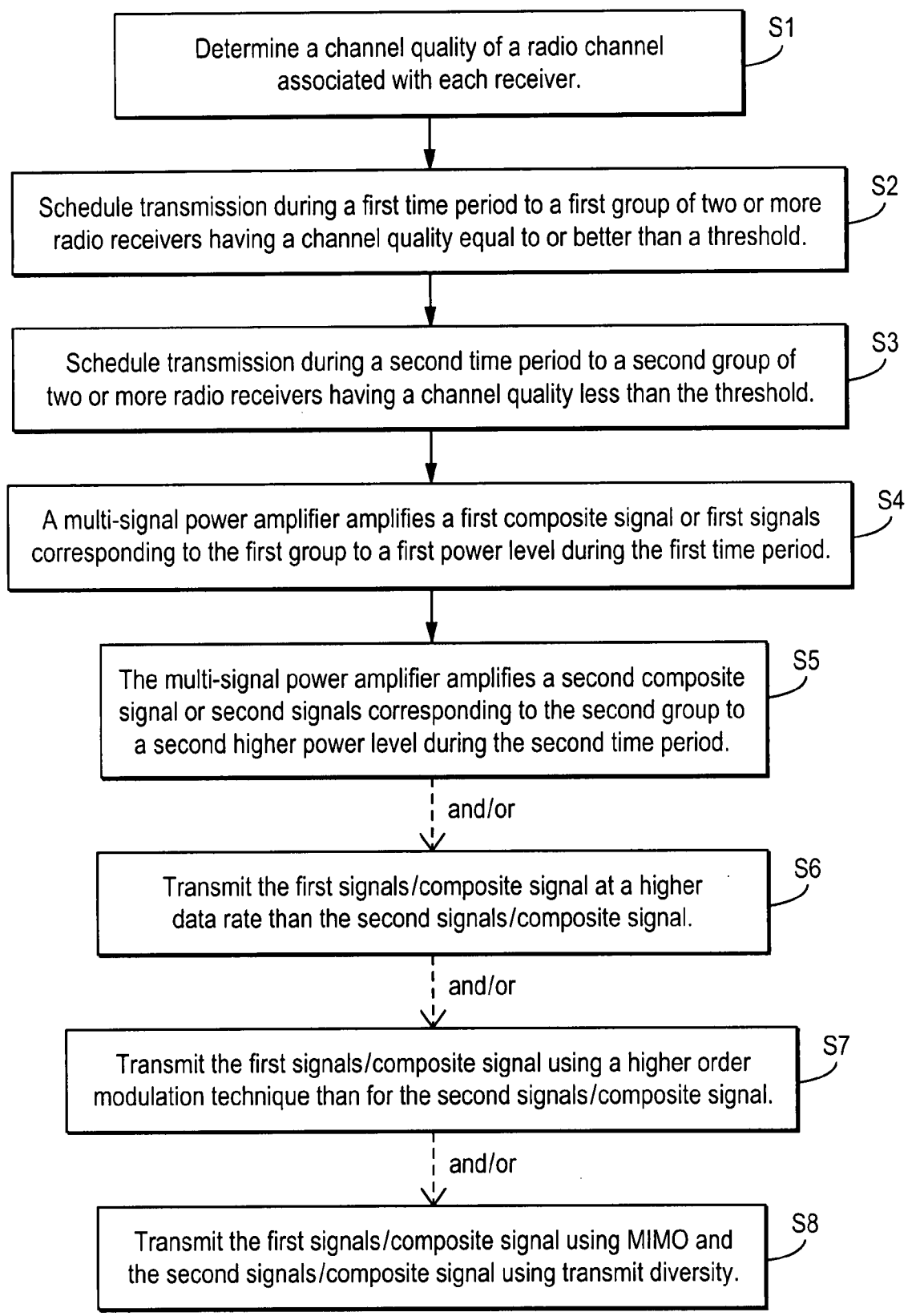
FIG. 8 is a flowchart illustrating non-limiting example procedures relating to scheduled amplifier backoff.

FIG. 8 is a flowchart illustrating non-limiting, example procedures relating to scheduled amplifier backoff. First, a channel quality of a radio channel associated with each receiver that will be receiving a signal from the transmitter is determined (Step S1). Based on the detected channel qualities, a first group of a number of (e.g., two or more) receivers having a channel quality equal to or better than a threshold is determined. Transmission to this first group of receivers is scheduled during a first time period (Step S2). A second group of a number of radio receivers having a channel quality less than the threshold is also formed. The transmission for the second group of receivers is scheduled during a second time period different from the first time period (Step S3). A multi-signal power amplifier amplifies a first composite signal or a first signal corresponding to the first group to a first power level during the first time period (Step S4). The multi-signal power amplifier amplifies a second composite signal or second signals corresponding to the second group at a second, higher power level during the second time period (Step S5).

A number of additional, optional adaptive transmission operations may also be employed if desired. Three non-limiting examples are described in conjunction with Steps S6, S7, and S8 of the flowchart in FIG. 8. One option in Step S6 is to transmit the first signals/composite signal at a higher rate than the second signals/composite signal. Higher bit rates, often associated with higher quality of service levels, are possible because of the better channel condition for the first group of radio receivers which permits less error coding. Also, in a CDMA application, different spreading factors could be used.

Step S7 identifies another possible operation for transmitting the first signals/composite signal using a higher order modulation technique than for the second signals composite signal. Higher order modulation techniques are most suitable when the channel quality is better and provide a better quality of service in the sense that higher data rates can be achieved using higher order modulation techniques.

Step S8 relates to an optional step where the first signals/composite signal may be transmitted using multiple input multiple output (MIMO) and the second signals/composite signal may be transmitted using transmit diversity. MIMO techniques are usually suitable only when the channel conditions are of reasonably good quality, but MIMO typically provides much higher date throughput than transmit diversity. On the other hand, transmit diversity is more suitable for radio channels whose condition is not as good. Transmit diversity sends approximately the same signal from two antennas so that twice as much power is used. There is also a "diversity gain" since the fading dips do not occur at the same position at the same time given the spacing between the antennas.

Figure 9:
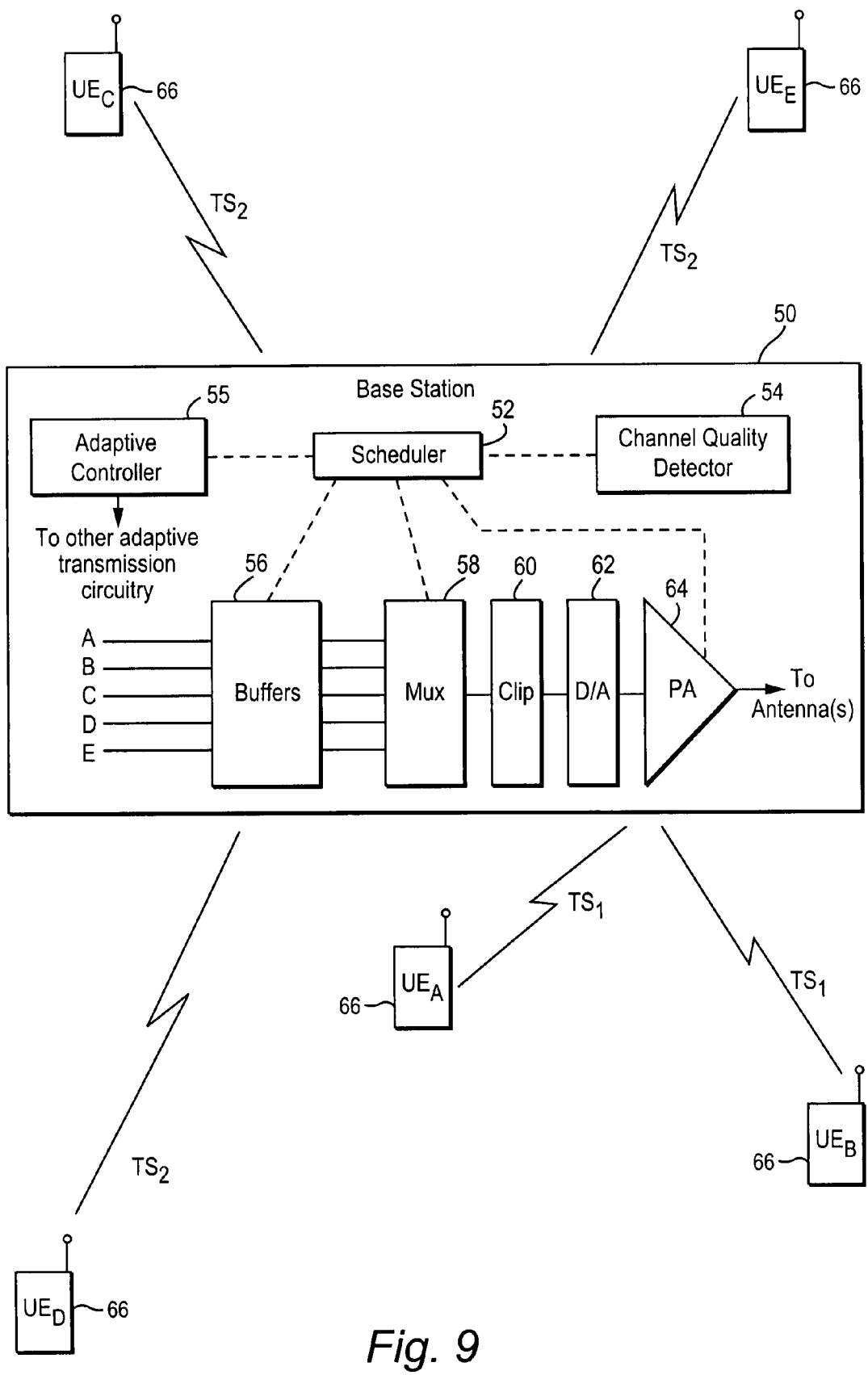
FIG. 9 is a diagram illustrating communications between a base station and several user equipment terminals.

FIG. 9 is a diagram illustrating communications between a base station 50 and several user equipment terminals 66 identified as $UE_A$-$UE_E$. The non-limiting example base station 50 includes a scheduler 52 coupled to a channel quality detector which receives channel quality information from the user equipment (UEs) 66 and provides a quality measure of the current radio channel condition from the base station 50 to each one of the UEs 66 to the scheduler 52. The scheduler 52 is coupled to an adaptive controller 55 which may be used to adapt certain transmission operations and/or parameters to current channel conditions. For example, the adaptive controller 55 may adapt the transmission bit rate, the modulation technique, and/or diversity techniques such as MIMO and transmit diversity.

Multiple digital signals A-E intended for $UEs_A$-$UE_E$ 66 are provided to one or more buffers 56 for temporary storage and delivery to a multiplexer 58, also coupled to scheduler 52. The base station scheduler 52 controls the multiplexer 58 to select one or more of the signals A-E during a particular time slot for transmission via the power amplifier (PA) 64. In this non-limiting, example embodiment, the multiplexer 58 combines the signals for amplification into a single composite signal. The digital composite signal is processed in a clipping block 60 which automatically clips the amplitude of the digital signal where it exceeds a maximum threshold. The clipping may be implemented as a digital function to ensure that the power amplifier does not go into saturation. This approach may be preferred because if the amplifier goes into saturation, it might take some time to become operational again. The clipped signal is provided to a digital-to-analog (D/A) converter 62 that converts the clipped digital signal to analog format. As an alternative, clipping may be performed on the analog signal. The power amplifier 64 receives a control signal from the scheduler 52, and depending on the time period, regulates the power amplification level to either a backoff lower power level to a no-backoff higher power level depending on the group of input signals selected for this time period and that group's associated channel quality.

In FIG. 9, the downlink radio channels to $UE_A$ and $UE_B$ have channel qualities that exceed a predetermined channel quality. As a result, the scheduler 52 schedules transmissions to these two UEs A and B during a first time slot $TS_1$. During that time slot, the buffered signals A and B are selected, combined by multiplexer 58, and output for amplification by the power amplifier 64 at a backed-off power level. The remaining UEs C-E are associated with lower channel qualities, and thus, the scheduler 52 sends a control signal to the multiplexer 58 to selected buffered signals C, D, and E for amplification by the power amplifier 64 during a different time slot $TS_2$ at a non-backedoff, higher power level. Although two groups of UEs are described, more groups may be used. Each group includes a different transmission time slot and a different amplifier backoff or transmission power level that depends on the different channel conditions associated with each UE group.

Figure 10:
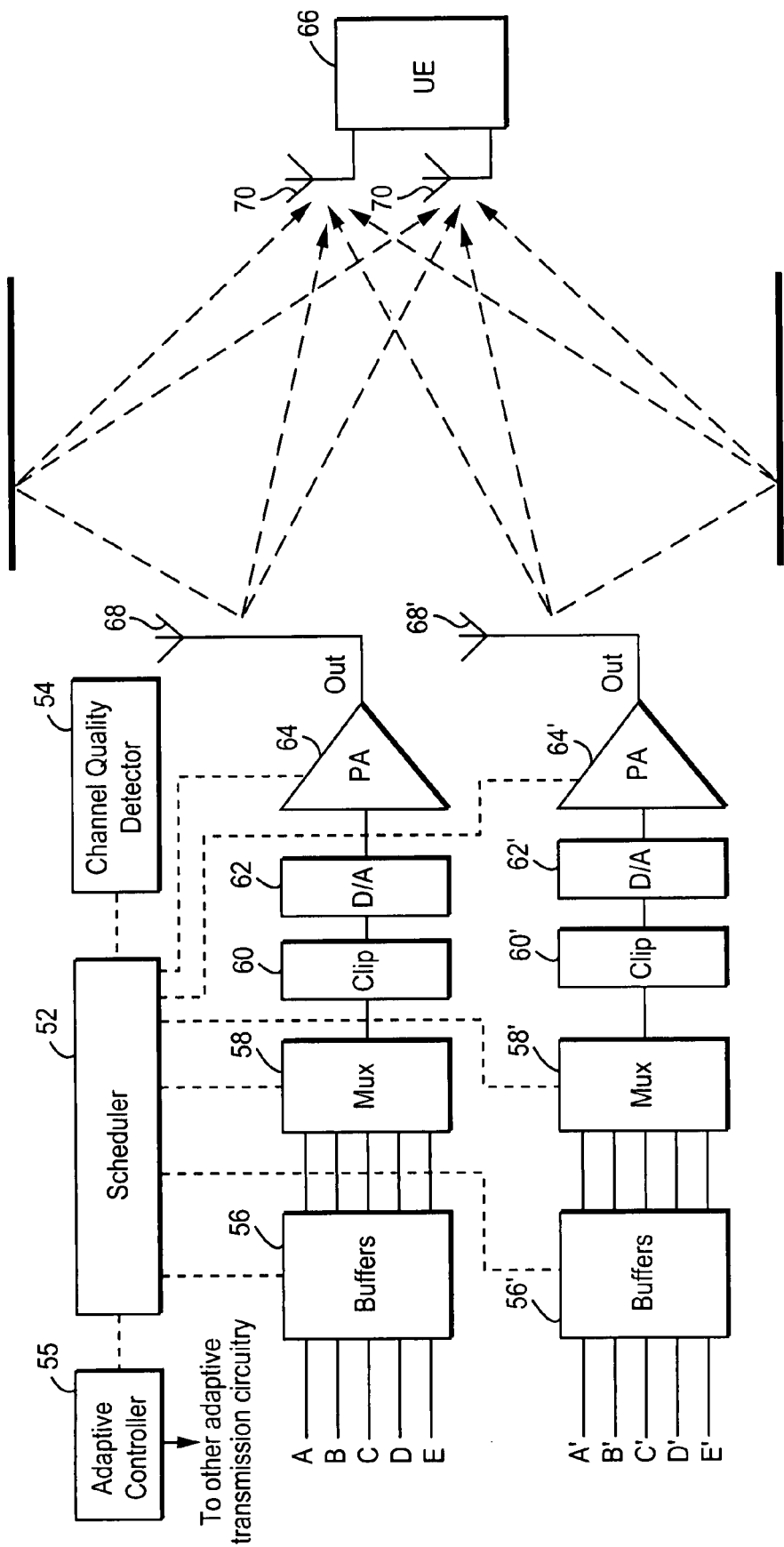
FIG. 10 illustrates another non-limiting example radio transmitter for transmission diversity and MIMO.

As indicated above, various adaptive transmission operations and/or parameters may also be adapted for the particular signals being transmitted during a particular time slot. Non-limiting examples included higher or lower data rate, higher or lower modulation technique, using a diversity technique, selecting between different diversity techniques, etc. The non-limiting example implementation shown in FIG. 10 shows different diversity techniques being used depending on the radio channel conditions. Two transmission paths in the transmitter are shown as an example. More transmission paths may be used. The first transmission path corresponds to that shown in FIG. 9 with buffers 56, multiplexer 58, clipper 60, digital to analog converter 62, power amplifier 64, and antenna 68. The second transmission path uses similar blocks and reference numerals with a prime symbol designating each block belong to the second branch.

Based on the detected channel quality associated with each of the signals, the scheduler 52 controls the multiplexers 58 and 58' to select whether one or both transmission paths are employed. For example, if the channel quality associated with UE 66 is relatively poor, which includes one or more antennas 70, the scheduler 52 groups UE 66 with a first group. The scheduler 52 then directs the multiplexer 58 to select transmission of the first group including signal A using transmit diversity via antennas 68 and 68' in which the same signal A is transmitted over the two antennas to the UE 66. Transmit diversity may be used when the channel quality is poor because transmitting two copies of the signal combats fading as well as double the power to provide a higher likelihood of accurate reception.

Alternatively, the scheduler 52 may control the multiplexers 58 and 58' to employ MIMO techniques for signals associated with a good quality radio channel. For MIMO transmission, the signal A is different from the signal A'. The same is true for B and B' and so forth. In this case, the channel qualities associated with the unprimed and primed signals must be determined separately. Signal B might be selected for group one but signal B' for group two. Although MIMO permits a higher bit rate, the demand for a better radio channel also increases. During time slots allocated to signals having lower channel quality, MIMO is preferably not used.

The scheduler 52 may control the signals to the buffers 56 and 56' to the multiplexer 58 and 58' depending on the radio channel conditions associated with the signals to be transmitted during a current time slot. If the radio channel conditions are good for the signals to be transmitted during this time slot, then the buffers 56 and 56' are controlled to store different signals and the multiplexers 58 and 58' controlled to select those signals for MIMO type transmission. Alternatively, if the radio channel conditions for this time slot are lower, the scheduler 52 ensures that the buffers 56 and 56' buffer copies of the same signals to be transmitted and multiplexers 58 and 58' select those signals during the same time period for transmission diversity.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for controlling radio transmissions to multiple radio terminals, comprising:
   determining channel qualities of different radio channels associated with the radio terminals;
   grouping first signals for a first number of radio terminals associated with a channel quality equal to or better than a predetermined level;
   grouping second signals for a second number of radio terminals associated with a channel quality less than the predetermined level;
   scheduling the first signals to be amplified by a power amplifier during a first time period;
   scheduling the second signals to be amplified by the power amplifier during a second time period;
   during the first time period, the power amplifier amplifying the first signals at a first power level and transmitting a first composite output signal; and
   during the second time period, the power amplifier amplifying the second signals at a second power level higher than the first power level and transmitting a second composite output signal,
   wherein the first power level is a backed-off mean power level that reduces a probability of clipping as compared to a probability of clipping at the second power level which is also a mean power level.

2. The method in claim 1, wherein the first signals include multiple signals input to the power amplifier or multiple signals combined before input to the power amplifier, and wherein the second signals include multiple signals input to the power amplifier or multiple signals combined before input to the power amplifier.

3. The method in claim 1, wherein the predetermined level is associated with a signal-to-noise ratio, a carrier-to-interference ratio, or a received signal strength value.

4. The method in claim 1, wherein the method is implemented in a radio base station and the predetermined level is determined based on information provided by the radio terminals.

5. The method in claim 4, wherein the radio base station transmits signals to the radio terminals using code division multiple access (CDMA) or orthogonal frequency division multiplexing (OFDM).

6. The method in claim 1, further comprising:
   transmitting the first composite signal to the first number of radio terminals at a first data rate higher than a second data rate at which the second composite signal is transmitted to the second number of radio terminals.

7. The method in claim 1, further comprising:
   transmitting the first composite signal to the first number of radio terminals using a first modulation technique that has a higher order than a second modulation technique used to transmit the second composite signal to the second number of radio terminals.

8. The method in claim 1, further comprising:
   transmitting the first composite signal to the first number of radio terminals using a MIMO communications technique while transmission of the second composite signal to the second number of radio terminals does not use a MIMO technique.

9. The method in claim 1, further comprising:
   transmitting the first composite signal to the first number of radio terminals using a multiple input multiple output (MIMO) technique, and
   transmitting the second composite signal to the second number of radio terminals using transmission diversity.

10. Apparatus for controlling radio transmissions to multiple radio terminals, comprising:
    a channel quality determination circuitry for determining channel qualities of radio channels associated with the radio terminals;
    scheduling circuitry for receiving the channel quality of a radio channel associated with each of the radio terminals, the scheduling circuitry being configured to schedule first signals for a first number of radio terminals associated with a channel quality equal to or better than a predetermined level for transmission during a first time period and to schedule second signals for a second number of radio terminals associated with a channel quality less than the predetermined level for transmission during a second time period; and
    a power amplifier for amplifying the first signals to output a first composite output signal and transmitting the first composite output signal at a first power level during the first time period, and for amplifying the second signals to output a second composite output signal and transmitting the second composite output signal at a second power level during the second time period,
    wherein the scheduling circuitry includes:
    buffering circuitry for buffering signals corresponding to the first and second numbers of radio terminals;
    a multiplexer coupled between the buffering circuitry and the power amplifier;
    a clipper for clipping an output of the multiplexer that exceeds a predetermined magnitude; and
    a scheduler for controlling which signals are provided from the buffering circuitry to the multiplexer or to the power amplifier.

11. The apparatus in claim 10, wherein the first signals include multiple signals input to the power amplifier or multiple signals combined before input to the power amplifier, and wherein the second signals include multiple signals input to the power amplifier or multiple signals combined before input to the power amplifier.

12. The apparatus in claim 10, wherein the first power level is a backed-off mean power level that reduces a probability of clipping as compared to a probability of clipping at the second power level which is also a mean power level.

13. The apparatus in claim 10, wherein the predetermined level is associated with a predetermined signal-to-noise ratio, a carrier-to-interference ratio, or a received signal strength value.

14. The apparatus in claim 10 implemented in a radio base station, wherein the predetermined level is based on information provided by the radio terminals.

15. The apparatus in claim 14, wherein the radio base station is configured to transmit signals to the radio terminals using code division multiple access (CDMA) or orthogonal frequency division multiplexing (OFDM).

16. The apparatus in claim 10, wherein the power amplifier is configured to transmit the first composite signal during the first time period at a first data rate higher than a second data rate at which the power amplifier is configured to transmit the second composite signal during the second time period.

17. The apparatus in claim 10, wherein the power amplifier is configured to transmit the first composite signal during the first time period using a first modulation technique that has a higher order than a second modulation technique for transmitting the second composite signal.

18. The apparatus in claim 10, wherein the power amplifier is configured to transmit the first composite signal during the first time period using a multiple input multiple output (MIMO) technique and to transmit the second composite signal during the second time period using transmission diversity.

19. The apparatus in claim 10, wherein the multiplexer is configured to combine the signals provided from the buffering circuitry and pass them to the power amplifier.

20. The apparatus in claim 10, wherein the multiplexer is configured to pass the signals provided from the buffering circuitry to the power amplifier.

21. Base station apparatus for controlling radio transmissions to multiple radio terminals, comprising:
 a power amplifier;
 means for determining channel qualities of different radio channels associated with the radio terminals;
 means for grouping first signals for a first number of radio terminals associated with a channel quality equal to or better than a predetermined level;
 means for grouping second signals for a second number of a number of radio terminals associated with a channel quality less than the predetermined level;
 means for scheduling the first signals to be amplified by the power amplifier during a first time period;
 means for scheduling the second signals to be amplified by the power amplifier during a second time period;
 means for controlling the power amplifier during the first time period to amplify the first signals associated with the first number of radio terminals at a first power level and transmitting a first composite output signal;
 means for controlling the power amplifier during the second time period to amplify the second signals associated with the second number of radio terminals at a second power level higher than the first power level and transmitting a second composite output signal;
 means for transmitting the first composite signal to the first number of radio terminals at a first data rate higher than a second data rate at which the second composite signal is transmitted to the second number of radio terminals; and
 means for transmitting the first composite signal to the first number of radio terminals using a first modulation technique that has a higher order than a second modulation technique used to transmit the second composite signal to the second number of radio terminals.

22. The apparatus in claim 21, wherein the first power level is a backed-off mean power level that reduces a probability of clipping as compared to a probability of clipping at the second power level which is also a mean power level.

23. The apparatus in claim 21, wherein the first signals include multiple signals input to the power amplifier or multiple signals combined before input to the power amplifier, and wherein the second signals include multiple signals input to the power amplifier or multiple signals combined before input to the power amplifier.

24. The apparatus in claim 21, wherein the radio base station transmits signals to the radio terminals using code division multiple access (CDMA) or orthogonal frequency division multiplexing (OFDM).

25. The apparatus in claim 21, further comprising:
 means for transmitting the first composite signal to the first number of radio terminals using a multiple input multiple output (MIMO) technique and the second composite signal to the second number of radio terminals are transmitted using transmission diversity.

* * * * *

UNITED STATES PATENT AND TRADEMARK OFFICE
CERTIFICATE OF CORRECTION

PATENT NO.         : 7,797,013 B2
APPLICATION NO.    : 11/711837
DATED              : September 14, 2010
INVENTOR(S)        : Skárby et al.

Page 1 of 1

It is certified that error appears in the above-identified patent and that said Letters Patent is hereby corrected as shown below:

On the Title Page, in item (12), under "United States Patent", in Column 1, Line 1, delete "Skarby" and insert -- Skárby --, therefor.

On the Title Page, in item (75), under "Inventors", in Column 1, Line 1, delete "Skarby," and insert -- Skárby, --, therefor.

On the Title Page, in item (75), under "Inventors", in Column 1, Line 1, delete "Karl-Gosta" and insert -- Karl-Gösta --, therefor.

Signed and Sealed this
Eleventh Day of January, 2011

David J. Kappos
*Director of the United States Patent and Trademark Office*